United States Patent
Crook et al.

(10) Patent No.: US 7,658,821 B2
(45) Date of Patent: Feb. 9, 2010

(54) PATTERNED PRESS FABRIC

(75) Inventors: Robert Crook, Wilson, NC (US); John Jeffery, Lancashire (GB); Lippi A. Fernandes, Overijssel (NL); Anthony Morton, Yorkshire (GB); Justin Payne, Lancashire (GB); David Ponton, Lancashire (GB); Luiz Carlos Silva, San Paulo (BR)

(73) Assignee: Voith Patent GmbH, Heidenheim (DE)

( * ) Notice: Subject to any disclaimer, the term of this patent is extended or adjusted under 35 U.S.C. 154(b) by 19 days.

(21) Appl. No.: 11/509,196

(22) Filed: Aug. 23, 2006

(65) Prior Publication Data

US 2008/0163998 A1   Jul. 10, 2008

Related U.S. Application Data

(60) Provisional application No. 60/711,589, filed on Aug. 26, 2005.

(51) Int. Cl.
*D21F 7/08* (2006.01)
*B32B 5/00* (2006.01)

(52) U.S. Cl. .................. 162/358.2; 442/281; 428/196; 156/62.2; 162/900

(58) Field of Classification Search ................ 162/116, 162/205, 348, 358.2, 358.4, 900–903, 361, 162/362; 442/270, 271, 275, 278, 281; 28/110, 28/142; 428/195.1, 196
See application file for complete search history.

(56) References Cited

U.S. PATENT DOCUMENTS

| 4,514,345 | A   |   | 4/1985 | Johnson et al. |
| 5,556,509 | A   | * | 9/1996 | Trokhan et al. ............ 162/111 |
| 5,904,811 | A   |   | 5/1999 | Ampulski et al. |
| 6,103,062 | A   | * | 8/2000 | Ampulski et al. ........... 162/109 |
| 6,743,571 | B1  |   | 6/2004 | Hill et al. |
| 2004/0126601 | A1 | * | 7/2004 | Kramer et al. ............. 428/480 |
| 2006/0198996 | A1 | * | 9/2006 | Morton .................... 428/292.1 |

FOREIGN PATENT DOCUMENTS

| WO | WO 99/09247 | * | 2/1999 |
| WO | WO 01/59210 | * | 8/2001 |

OTHER PUBLICATIONS

Shore Durometer Comparison Chart [online], [retrieved Jun. 6, 2009]. Retrieved from the Internet <http://www.ttequip.com/KnowledgeLibrary/TechPageShoreDurometerConversionChart.htm>.*

* cited by examiner

*Primary Examiner*—Eric Hug
(74) *Attorney, Agent, or Firm*—Taylor & Aust, P.C.

(57) ABSTRACT

A press fabric having a plurality of surface pressing plates on a sheet side of the fabric imparts an impression onto a sheet of paper web during a pressing process. The surface pressing plates are preferably resin pressing plates, and form at least one of a random pattern of dots, a predetermined pattern of dots, a grid pattern of dots, a regular grid pattern of lines, an irregular grid pattern of lines a plurality of squiggly lines, a plurality of wavy lines, a plurality of straight lines, words and pictures.

17 Claims, 4 Drawing Sheets

PATTERNED PRESS FABRIC

CROSS-REFERENCE TO RELATED APPLICATIONS

The present application claims priority under 35 U.S.C. § 119 of U.S. Patent Application No. 60/711,589 filed Aug. 26, 2005, the disclosure of which is expressly incorporated by reference herein in its entirety.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The invention relates to a fabric having a plurality of pressing plates. More specifically, the invention relates to a press fabric for drying a paper web, for example tissue, that has a plurality of pressing plates that aid in the pressing and may leave predetermined markings or impressions on the paper.

2. Description of Background

Conventional needle punched press felt surfaces are limited in how well they can physically contact a paper sheet web to effectively "squeeze" water from the web by the size and packing density of the fibers. Using a woven or nonwovens as the pressing surface has not been successful due to problems with the sheet mark, poor drying ability, and/or poor durability. Studies show that using laser punched or sintered metal blocks with high land areas show very high degree of pressing dryness is possible, however no practical applications have been fabricated. A higher degree of physical contact between the paper web in the nip and the pressing of fabric has previously been possible, however they have led to objectionable sheet markings or disruption of the fabrication process.

Pressing fabrics for various applications are known. For example, in WO 2005/075732 to Scherb discloses a permeable belt acting with a press belt for use in a papermachine for the manufacture of tissue and/or toweling, where the web is dried by the blowing of hot air from one side of the sheet through the web to the other side of the sheet. In standard tissue-making, the press felt acts in the same position as a conventional press. That is, one roll is plain faced and the other is plain, grooved or drilled. The fabric acts to dewater the web by transmitting the water to one or more dewatering devices.

With regards to printing or pressing a pattern onto a web, U.S. Pat. No. 6,398,910 discloses a two-layer forming fabric with a structured weave having a background texture and/or a decorative pattern that can be imparted onto the web.

In contrast, U.S. 2005/0087316 discloses the use of a stitched surface embossing element on a press fabric. Here, the stitching is arranged on the first face of the carrier layer to provide a design on the first face which is imparted by imprinting onto a resultant paper product.

BRIEF SUMMARY OF THE INVENTION

Accordingly, there is a need for a press fabric that improves dewatering of the resultant paper product. There is also a need for a press fabric that can effectively mark a resultant paper product with a three-dimensional pattern. The present invention is for a press fabric used in the production of various paper products, including paper, tissue and towels. In a preferred embodiment, the press fabric is a conventional needle punched press felt having increased contact, or land area on the surface of the press felt due to the addition of pressing plates.

The press fabric of the present invention can impart a pattern, design, logo, etc. onto the resultant paper product. To do this, the press fabric includes a topographical pattern. The topographical pattern may be the result of a surface coating that increases the high land area on the surface of the fabric.

In one embodiment, the high contact area on the surface of a conventional needle punched press felt is the result of a series of solid plastic "pressure plates" that are attached to and embedded within the surrounding textile batt fibers. The pressure plates are shaped and sized such that, for a given paper grade grams per square meter (GSM), water content, furnish type, and press dwell time, there is an optimization of the mechanical pressing effect, versus the water flow requirements to ensure that excessive hydraulic pressure does not occur and disrupt the formation of the paper fibers. To effectively perform in dewatering, the pressure plates need only be present. That is, the pressure plates are not required to protrude, rather, the pressure plates can be beneath the surface of the press fabric, flush with the press fabric, or above the surface of the press fabric. Accordingly, relative to the surface of the press fabric, the surface of the pressure plates can be such that they are −2 mm to +3 mm, preferably −1 mm to +1 mm. When the pressure plates are to protrude from the surface of the press fabric, the plates are made to a predetermined positive distance from the surface. When the pressure plates are to be below the surface of the press fabric, this value is a negative distance.

The pressing plates may also be engineered to impart a micro type and embossment to the sheet or web. The result of adding these pressing plates is improvement in the aerodynamic properties at high speeds for transfer control, absorption of coatings, reeling properties, etc. Application of the pressing plates can be different at different portions of the felt, for example, the quantity and size of the pressing plates can be different from the edges of the felt, for example to differentially affect the sheet edges, versus the center region of the felt. When the pressing plates are used to emboss the sheet or web, it is anticipated that the pressing plates will be above the surface of the press fabric a predetermined positive distance. It is also envisaged that negative embossment can be designed when the pressing plates are below the surface of the press fabric.

Besides the mechanical pressing enhancement for a dewatering, the pressing plates may also help prevent re-wet to the sheet based on the differential expansion behaviour and relative degree of micro impermeability at the surface and rate of water flow around the plates, plus the distance of the flow path in the compression phase of the press nip vs. rate of "reverse flow" (rewet) that may occur on the expansion and exit side of the press nip.

In the preferred embodiment, solid dots of resin are applied to the sheet side of a pressing fabric. The resin is preferably urethane or silicone based. The dots of resin are preferably formed by applying the resin using a screen printing application. Alternatively, the dots of resin can be formed using rapid photo typing, inkjet technology, electrostatic paint spraying, powder coating application, and any other technique suitable for forming dots of resin or other suitable polymeric material on the surface of a pressing felt. The resin dot pattern can be random or predetermined. For example, a predetermined pattern can be regularly spaced dots, grids, squiggly lines, shaped dots such as ovals or polygonal, words, pictures, and the like. Additionally, the dots of resin can be fabricated to deliberately mark the sheet for texture by affecting topography, grids, etc. In the preferred embodiment, small dot random pattern is preferred for minimal visible sheet imprint. After forming to the dots of resin, the fabric may be calendared to make the top surface of the resin dots more planar.

Additionally, penetration of the dots into the fibrous substrate is controlled via viscosity of the resin, wetting and melt behaviour of the resin, and subsequent finishing against a hot pressing cylinder dryers and compaction rolls. Binding of the resin via its own adhesive nature, can be either cross-linkable or thermoplastic low melt.

For certain specialized paper grades, such as on a Yankee machine for making tissue or toweling, the pressing plates may also enhance the bulk and absorption properties of the sheet due to differential degree of pressing. For example, a Yankee pickup felt with 3.3 dtex surface is screen printed using a random dot pattern, each dot being approximately 1.0 mm diameter, and 64 dots per square centimeter, with a cross-linking polyurethane resin that penetrates into the batted surface approximately 0.5 mm after finishing face to hot role with the compaction.

When used in a belt press operation, as disclosed in WO 2005/075732, hereby incorporated by reference in its entirety, the fabric of this invention includes a surface topographical pattern. The pattern, as discussed above, may also be made of deposited polymeric material. This fabric is used in combination with two or more other fabrics as part of a belt press operation. In this concept the paper web is formed between an inner and outer fabric. The formed sheet is then carried on the inner fabric until it meets a convergence between a high tension belt on one side and the structured press fabric on the other side. The high tension belt effectively presses the "sandwich" against a suction roll. A hot source, for example a steam box, may be positioned above the permeable high tension belt to optimise dewatering from the sheet through the press fabric and expulsion into the suction roll. The topographical pattern areas on the press fabric provide areas/points that affect the consolidation and drying of the web. This results in a structured paper web exiting the belt press.

For this embodiment, the "press fabric" must run as part of the "sandwich" which consists of the high tension belt, transfer/moulding fabric to be tensioned and run around the static or rotating extended dewatering nip of the ATMOS concept. The nip wrap angle is controlled by use of "lead in roll" and "lead out roll" that are within the loop of the high tension belt. The nip can have a wrap angle of between 30° and 180° but preferably between 50° and 130°. The ideal nip length is between 1200 mm and 1500 mm across a suction roll diameter of 1.40 m-1.70 m.

The press fabric typically comprises a base structure. This base structure may comprise of warp and weft yarns that are woven to form an interlaced design. The yarns used to form such a base may comprise monofilament, or multifilament, or spun material or any combination of the above. It is not necessary that the base comprises yarn that are interlaced through weaving. The base may comprise a non woven (e.g. membrane) style structure that may or may not contain yarns in either the machine direction (MD) or cross-machine direction (CMD). Such yarns (if present) could be encased within a polymer matrix to give integrity to the structure. The base structure is designed such that it has a degree of openness—i.e. permeability.

A base structure may consist of a woven, non woven, spiralled entity—or any combination of the above. The base structure is then further consolidated by addition of further layers (these could be laminated spun bond layers or they could consist of mechanically or chemically interlocked fibres (typically between 1.5-44 dtex). spun bond or fibre layers may or may not be graduated in terms of finesses towards the resulting paper contacting surface. Generally the final paper contacting surface would contain the finer structure.

The press fabric is then subjected to controlled polymer deposition onto its paper side surface to provide the final structure. Polymer may be deposited to form a structured or random dot array or it may be deposited in a more continuous way to form line based designs.

The resulting pattern produced on the surface of the press fabric must have integrity and should adhere through chemical interaction or mechanical interlocking, (or a combination of both) to the fibrous surface of the press fabric. Typical polymer materials would be based on polyurethanes but other polymer material groups, such as esters, amides, silicones, epoxies, natural and synthetic rubbers may be equally well applied.

The polymer will typically resist the mechanical impositions of the press sandwich arrangement and will therefore have a final hardness in the region of 20-98 shore A, ideally in the range 60-97 shore A.

The polymer would typically be essentially non-permeable to vapour once fully cured and apparent on the felt surface. If desired, the polymer material may have a predetermined degree of vapour permeability. Accordingly, the desired permeability is from 0 cfm to 50 cfm, preferably from 0 cfm to 20 cfm.

When used to mark or otherwise affect the texture of the paper or web, the dot or other line structure will have an x,y,z dimension according to the requirements for the finished paper sheet. Typically the z dimension (structure height) will be in similar proportion to the x dimension (dot/line width). The y dimension (line length) may or may not be in similar proportion. For example, for a dot structure whereby the dots are to be above the surface of the press fabric, it may be that individual dots may have a z dimension height of 0.02 mm-1.0 mm, more likely 0.05-0.50 mm. For a z dimension of 0.20 mm it would be typical to expect that the x and y dimension of individual dots is also of the order of 0.20 mm. For a line based structure however it may be that the y dimension (line length) is the same or much greater than the z or x dimension.

The pattern thus formed on the surface of the press fabric may comprise discrete regular or irregular arrays or may form a single continuous effect over the whole area of the surface.

The effect is imparted to the sheet as it is pushed down onto the press fabric by the tension effect of the high tension belt. It is the "bottom" surface of the sheet that is the primary surface that is in contact directly with the structured press fabric. It is the same surface of the sheet that was facing the outer wire as the sheet was formed and will be the surface of the sheet that is in direct contact with the Yankee cylinder (if present).

These and other features and advantages of this invention are described in or are apparent from the following detailed description of the preferred embodiments.

BRIEF DESCRIPTION OF THE DRAWINGS

The preferred embodiments of the present inventions is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
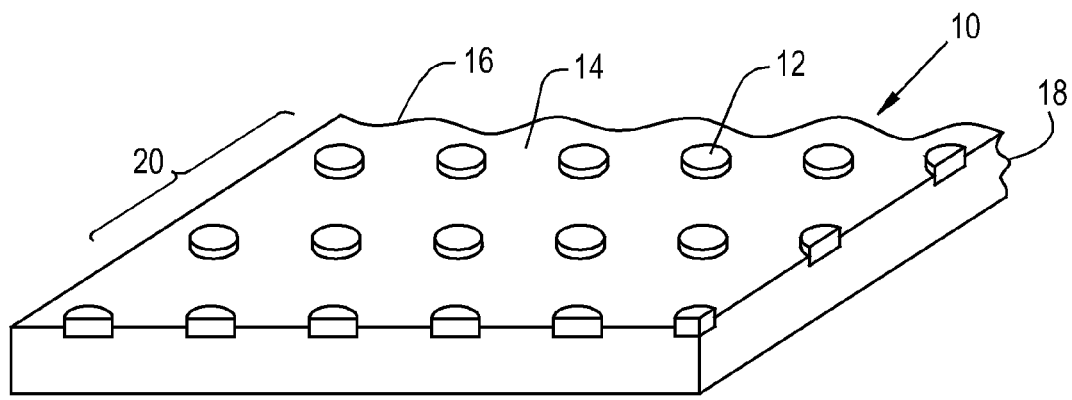
FIG. 1 is a perspective view of a fabric having dots of resin penetrating the fabric surface.
Figure 2:
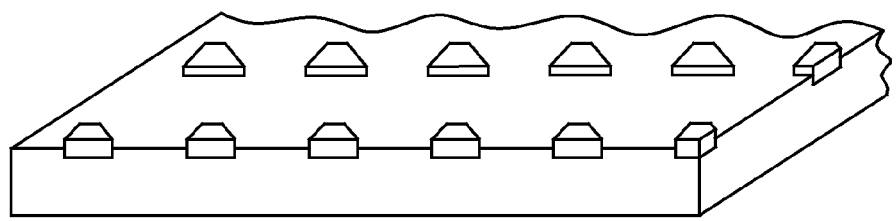
FIG. 2 is a perspective view of a fabric having dots of resin penetrating the fabric surface.
Figure 3:
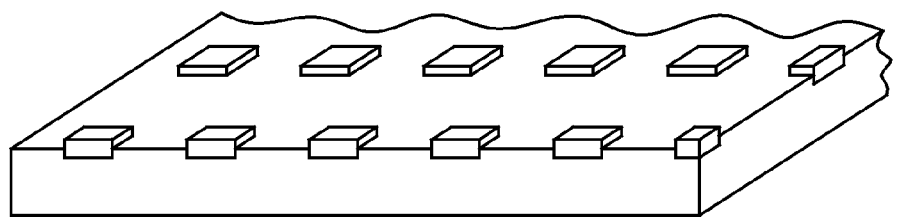
FIG. 3 is a perspective view of a fabric having resin in a trapezoidal shape penetrating the fabric surface.

FIGS. 1-3 are perspective views of a fabric 10 having protruding pressing plates 12 of resin penetrating the fabric surface 14. The fabric 10 can be any fabric usable in papermaking. Preferably, the fabric 10 is a press felt known in the art, for example, a needle punched press felt where batt fibers are needled punched onto a supporting layer or layers.

The press fabric 10 typically comprises a base structure. This base structure may comprise of warp and weft yarns that are woven to form an interlaced design. The yarns used to form such a base may comprise monofilament, or multifilament, or spun material or any combination of the above. It is not necessary that the base comprises yarn that are interlaced through weaving. The base may comprise a non woven (e.g. membrane) style structure that may or may not contain yarns in either MD or CMD. Such yarns (if present) could be encased within a polymer matrix to give integrity to the structure. The base structure is designed such that it has a degree of openess—i.e. permeability.

The base structure may consist of a woven, non woven, spiralled entity—or any combination of the above.

The base structure is then further consolidated by addition of further layers (these could be laminated spun bond layers or they could consist of mechanically or chemically interlocked fibres (typically between 1.5-44 dtex). spun bond or fibre layers may or may not be graduated in terms of finesses towards the resulting paper contacting surface. Generally the final paper contacting surface would contain the finer structure.

The press fabric 10 is then subjected to controlled polymer deposition onto its paper side surface to provide the final structure. Polymer may be deposited to form a structured or random dot array or it may be deposited in a more continuous way to form line based designs.

In the first embodiment, the high contact area on the fabric surface 14 of a needle punched press felt 16 is the result of a series of solid plastic pressure plates 12 that are attached to and embedded within the surrounding textile batt fibers 18. The pressure plates 12 are shaped and sized such that, for a given paper grade GSM, water content, furnish type, and press dwell time, there is an optimization of the mechanical pressing effect, versus the water flow requirements to ensure that excessive hydraulic pressure does not occur and disrupt the formation of the paper fibers.

Figure 4:
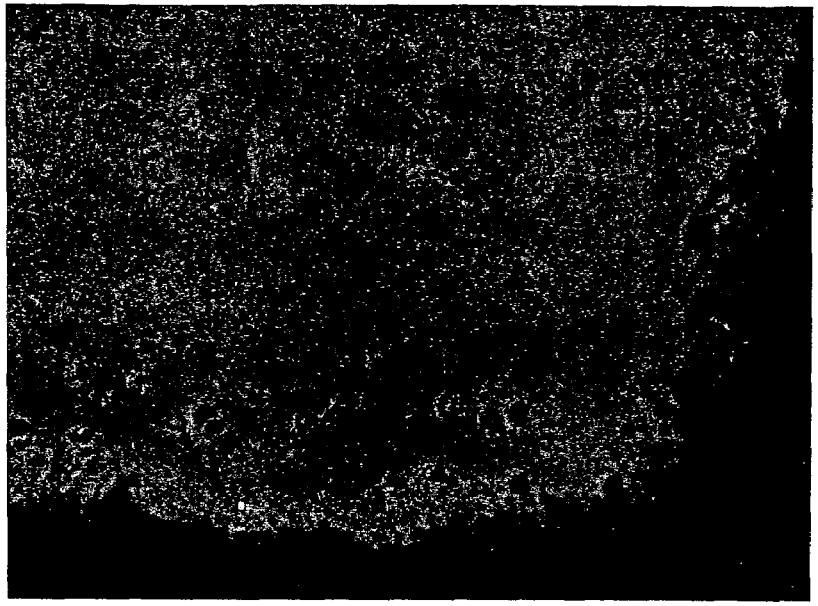
FIG. 4 is a photograph showing a perspective view of the surface dots on a fabric.
Figure 5:
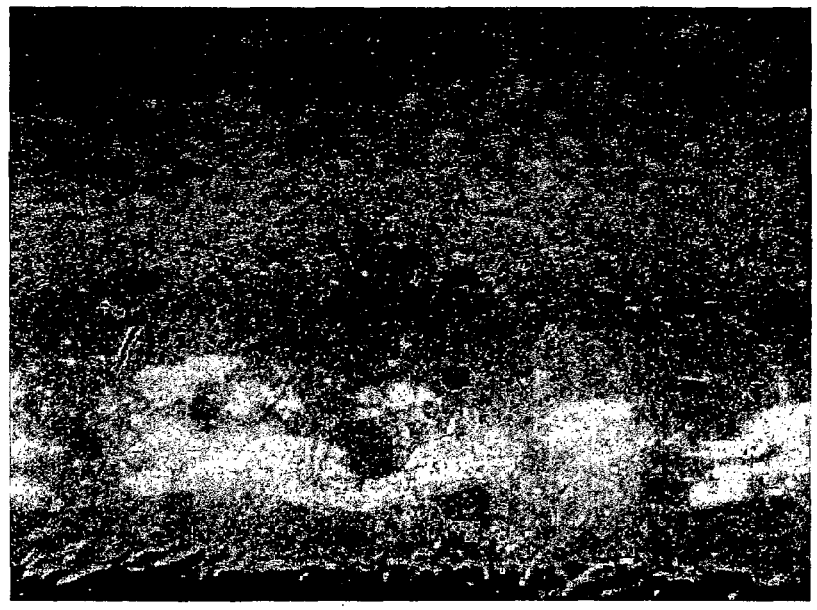
FIG. 5 is a photograph showing a perspective view of resin dots penetrating into the batt of a press fabric.
Figures 6, 7:
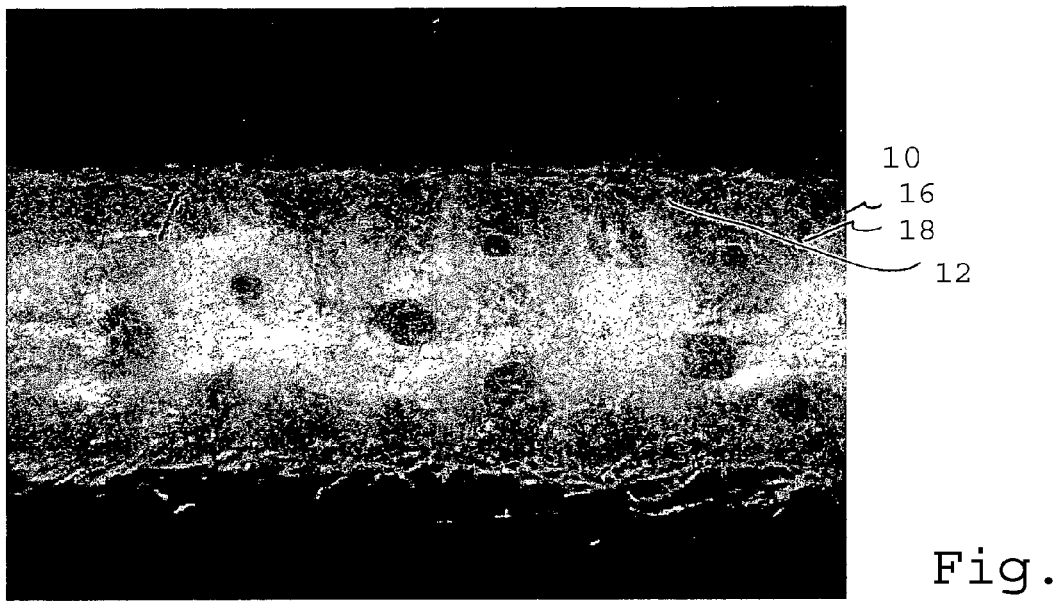
FIG. 6 is a photograph showing a cross section of resin dots penetrating into the batt of a press fabric.
FIG. 7 is a plan view of a fabric having resin in a predetermined text pattern.

FIGS. 4-6 are close-up photographs of the first embodiment whereby resin pressing plates 12 are incorporated into the batt fibers 18 on the surface 14 of a press felt 16. In FIGS. 1-6, the pressing plates 12 are depicted in a random or pseudo-random pattern on the surface 14 of the fabric 10. The actual locations of the pressing plates 12 may be predetermined or random.

Similarly, the shape and size of the pressing plates 12 are such that, for a given paper grade GSM, water content, furnish type, and press dwell time, there is an optimization of the mechanical pressing effect, versus the water flow requirements to ensure that excessive hydraulic pressure does not occur and disrupt the formation of the paper fibers. To effectively perform in dewatering, the pressure plates need only be present. That is, the pressure plates are not required to protrude, rather, the pressure plates can be beneath the surface of the press fabric, flush with the press fabric, or above the surface of the press fabric. Accordingly, relative to the surface of the press fabric, the surface of the pressure plates can be such that they are −2 mm to +3 mm, preferably −1 mm to +1 mm. When the pressure plates are to protrude from the surface of the press fabric, the plates are made to a predetermined positive distance from the surface. When the pressure plates are to be below the surface of the press fabric, this value is a negative distance.

The pressing plates 12 may also be engineered to impart a micro type and embossment to the sheet or web. The result of adding these pressing plates 12 is improvement in the aerodynamic properties at high speeds for transfer control, absorption of coatings, reeling properties, etc.

Application of the pressing plates 12 can be different at different portions of the fabric 10, for example, the quantity and size of the pressing plates 12 can be different from the edges of the fabric 10, for example to differentially affect the sheet edges, versus the center region of the felt.

Along with the mechanical pressing enhancement for a dewatering, the pressing plates 12 may also help prevent re-wet to the sheet based on the differential expansion behaviour and relative degree of micro impermeability at the surface.

In the preferred embodiment, solid dots of resin 12 are applied to the sheet side 14 of a pressing fabric 16. The resin forming the pressing plates is preferably urethane or silicone based. The dots of resin 12 are preferably formed by applying the resin using a screen printing application. Alternatively, the dots of resin 12 can be formed using various techniques known in the are of resin application, for example, but not limited to, rapid photo typing, inkjet technology, electrostatic paint spraying, powder coating application, and any other technique suitable for forming dots of resin or other suitable polymeric material on the surface 14 of a pressing felt 16. As discussed above, the resin dot pattern 20 can be random or predetermined. For example, a predetermined pattern can be regularly spaced dots, regular and/or irregular grids, squiggly, straight or wavy lines, a combination of any or all of squiggly, wavy and straight lines, shaped dots such as ovals or polygonal, words (as shown in FIG. 7), pictures, and the like, or any combination of any shape suitable for the paper making process to be performed.

In one embodiment, the dot (or line structure) 20 will have an x,y,z dimension according to the requirements for the finished paper sheet. Typically the z dimension (structure height) will be in similar proportion to the x dimension (dot/line width). The y dimension (line length) may or may not be in similar proportion. For example, for a dot structure it may be that individual dots may have a z dimension height of 0.02 mm-1.0 mm, preferably 0.05-0.50 mm. For a z dimension of 0.20 mm it would be typical to expect that the x and y dimension of individual dots is also of the order of 0.20 mm. For a line based structure however it may be that the y dimension (line length) is the same or much greater than the z or x dimension.

The pattern thus formed on the surface of the press fabric may comprise discrete regular or nonregular arrays or may form a single continuous effect over the whole area of the surface.

Additionally, the dots of resin 12 can be fabricated to deliberately mark the sheet for texture by affecting topography, grids, etc. In the preferred embodiment, small dot random pattern is preferred for minimal visible sheet imprint. After forming to the dots of resin, the fabric may be calendared to make the top surface of the resin dots more planar.

The resulting pattern produced on the surface 14 of the press fabric 10 must have integrity and should adhere through chemical interaction or mechanical interlocking, (or a combination of both) to the fibrous surface of the press fabric. Typical polymer materials would be based on polyurethanes but other polymer material groups, such as esters, amides, silicones, epoxys, natural and synthetic rubbers may be equally well applied.

As applied, the polymer will typically resist the mechanical impositions of the press sandwich arrangement and will therefore have a final hardness in the region of 20-98 shore A, ideally in the range 60-97 shore A.

The polymer would typically be totally non-permeable to vapour once fully cured and apparent on the felt surface. It is also be envisaged that the polymer material may have a degree of vapour permeability, if desired, of 0 cfm to 50 cfm, preferably from 0 cfm to 20 cfm.

Penetration of the applied dots into the fibrous substrate of the fabric 10 is controlled by at least one of viscosity of the resin, wetting and melt behaviour of the resin, and subsequent finishing against a hot pressing cylinder dryers and compaction rolls. Binding of the resin via its own adhesive nature, can be either cross-linkable or thermoplastic low melt.

For certain specialized paper grades, such as on a Yankee machine (not shown) for making tissue or toweling, the protuberances 12 may also enhance the bulk and absorption properties of the sheet due to differential degree of pressing. For example, a Yankee pickup felt with 3.3 dtex surface is screen printed using a random dot pattern, each dot being approximately 1.0 mm diameter, and 64 dots per square centimeter, with a cross-linking polyurethane resin that penetrates into the batted surface approximately 0.5 mm after finishing face to hot roll with the compaction.

Figure 8:
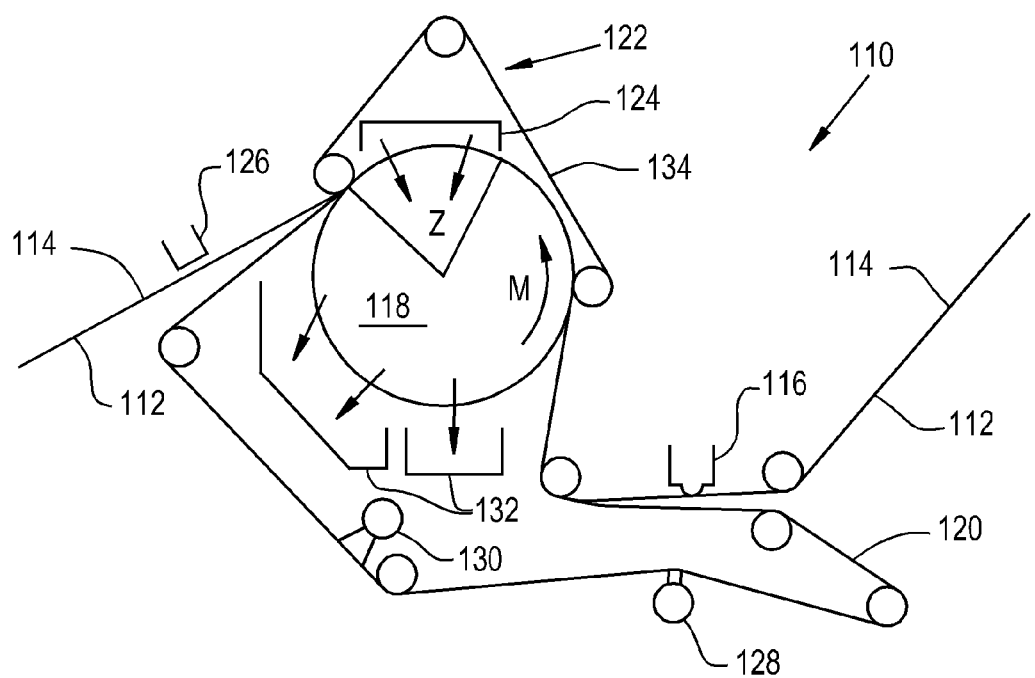
FIG. 8 is a cross-sectional view of an advanced dewatering system of a belt press.

FIG. 8 is a cross-sectional view of an advanced dewatering system of a belt press, and more particularly, an advanced dewatering system 110 for processing a fibrous web 112. System 110 includes a fabric 114, a suction box 116, a vacuum roll 118, a dewatering fabric 120, a belt press assembly 122, a hood 124 (which may be an air hood), a pick up suction box 126, a Uhle box 128, one or more shower units 130, and one or more saveralls 132. The fibrous material web 112 enters system 110 generally from the right as depicted in FIG. 8. Fibrous web 112 is a previously formed web that is formed by an apparatus which is not shown, which is placed on the fabric 114. The suction device 116 provides suctioning to one side of the web 112, while the suction roll 118 provides suctioning to an opposite side of the web 112. The dewatering fabric 120 may be the press fabric 10 of the present invention.

In the advanced dewatering system 110, the fibrous web 112 is carried on the inner fabric 114 until it meets a convergence between a high tension belt on one side and the press fabric 10 on the other side. The high tension belt 114 presses or "sandwiches" the fibrous web 112 against the vacuum roll 118. A heat source may be positioned above the high tension belt, or inner fabric 114 to optimise dewatering from the web 112 through the press fabric 10 and expulsion into the suction roll 118. The topographical pattern areas 20 on the press fabric 10 provide areas/points that affect the consolidation and drying of the web 112. This results in a structured paper web exiting the advanced dewatering system 110.

When used in the advanced dewatering system 110, the nip wrap angle is controlled by use of "lead in roll" and "lead out roll" that are within the loop of the high tension belt, or inner fabric 114. The nip can have a wrap angle of between 30° and 180°, but preferably between 50° and 130°. The ideal nip length is between 1200 mm and 1500 mm across a suction roll 118 with a diameter of 1.40 m-1.70 m.

The effect of the dots 12 or array 20 is that they impart an impression onto the sheet as it is pushed down onto the press fabric by the tension effect of the high tension belt. It is the "bottom" surface of the sheet that is the primary surface that is in contact directly with the structured press fabric. It is the same surface of the sheet that was facing the outer wire as the sheet was formed and will be the surface of the sheet that is in direct contact with the Yankee cylinder (if present).

While the present invention has been particularly shown and described with reference to the foregoing preferred embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed as new and desired to be protected by Letters Patent of the United States is:

1. A press fabric comprising:
   a plurality of pressing plates on a sheet side of the press fabric, the press fabric including a batt of fibers forming the sheet side of the press fabric, the pressing plates being attached to and embedded within the batt of fibers, the pressing plates being vapour permeable.

2. The press fabric of claim 1:
   wherein the sheet side of the fabric has a sheet side surface;
   wherein the pressing plates are at least one of plurality of pressing plates on a sheet side of the fabric; and
   wherein a top surface of the pressing plates are at least one of beneath the sheet side surface of the press fabric, flush with the sheet side surface of the press fabric, and above the sheet side surface of the press fabric.

3. The press fabric of claim 2:
wherein the top surface of the pressure plates are between approximately 2 mm below the sheet side surface and +3 mm above the sheet side surface.

4. The press fabric of claim 1:
wherein the pressing plates are a predetermined series of resin pressing plates.

5. The press fabric of claim 4:
wherein the resin pressing plates are at least one of a random pattern of dots, a predetermined pattern of dots, a grid pattern of dots, a regular grid pattern of lines, an irregular grid pattern of lines a plurality of squiggly lines, a plurality of wavy lines, a plurality of straight lines, words and pictures.

6. The press fabric of claim 4:
wherein the pressing plates are a series of resin dots, and wherein the dots are shaped dots.

7. The press fabric of claim 6:
wherein the shaped dots are at least one of circles, ovals, polygonal, words, and shapes.

8. The press fabric of claim 1:
wherein the pressing plates are based on at least one of polyurethanes, esters, amides, silicones, epoxys, natural rubbers and synthetic rubbers.

9. The press fabric of claim 1 wherein the pressing plates impart at least one of a micro type and embossment to a sheet or web.

10. The press fabric of claim 1 wherein the fabric is usable in an advanced dewatering system of a belt press.

11. The press fabric of claim 1, wherein the pressing plates have a hardness of at least one of 20 to 98 shore A and 60-97 shore A.

12. The press fabric of claim 1, wherein the pressing plates have a vapour permeability of at least one of (a) one of less than and equal to 50 cfm and (b) one of less than and equal to 20 cfm.

13. The press fabric of claim 1, wherein said sheet side of the press fabric includes a sheet side surface which is formed by said batt of fibers, said plurality of pressing plates including a top surface which is above said sheet side surface of the press fabric.

14. The press fabric of claim 1, wherein said sheet side of the press fabric includes a sheet side surface which is formed by said batt of fibers, said plurality of pressing plates including a top surface which is flush with said sheet side surface of the press fabric.

15. A method of fabricating a press fabric having pressing plates, comprising the steps of:
determining a pattern;
applying a resin to a sheet side surface of the press fabric while controlling size and shape of the resin according to the pattern; and
bonding the resin to the sheet side surface to form the pressing plates, the press fabric including a batt of fibers forming the sheet side surface of the press fabric, the pressing plates being attached to and embedded within the batt of fibers, the pressing plates being vapour permeable.

16. The method of claim 15, wherein the pressing plates include a top surface which is above said sheet side surface of the press fabric.

17. The method of claim 15, wherein the pressing plates include a top surface which is flush with said sheet side surface of the press fabric.

* * * * *